United States Patent
Hambsch et al.

[19]

[11] Patent Number: 6,113,140

[45] Date of Patent: Sep. 5, 2000

[54] APPARATUS FOR NONCONTACT TRANSMISSION OF SIGNALS BETWEEN STEERING WHEEL AND STEERING COLUMN

[75] Inventors: Katja Hambsch, Bretten; Thomas Herrmann, Gauting, both of Germany

[73] Assignee: Robert Bosch GmbH, Stuttgart, Germany

[21] Appl. No.: 09/169,556

[22] Filed: Oct. 9, 1998

[30] Foreign Application Priority Data

Oct. 10, 1997 [DE] Germany .............................. 197 44 760

[51] Int. Cl.$^7$ ................................................... B60R 21/32
[52] U.S. Cl. .......................................... 280/735; 340/436
[58] Field of Search ................................ 280/734, 735; 340/428, 436; 307/10.1; 439/15, 164

[56] References Cited

U.S. PATENT DOCUMENTS

| | | | |
|---|---|---|---|
| 4,973,912 | 11/1990 | Kaminski et al. ..................... | 340/436 |
| 4,987,316 | 1/1991 | White et al. ............................ | 307/10.1 |
| 5,081,442 | 1/1992 | Ito et al. . | |
| 5,293,153 | 3/1994 | Rochette et al. ....................... | 307/10.1 |
| 5,459,449 | 10/1995 | Ravas, Jr. et al. ..................... | 280/735 |
| 5,612,623 | 3/1997 | Watanabe et al. ..................... | 340/436 |
| 5,621,326 | 4/1997 | Watanabe et a. ...................... | 280/735 |
| 5,636,863 | 6/1997 | Reid et al. ............................. | 280/735 |
| 5,934,704 | 8/1999 | Hansen et al. ......................... | 280/735 |
| 5,936,313 | 8/1999 | Cook, Jr. et al. ..................... | 307/10.1 |

FOREIGN PATENT DOCUMENTS

| | | |
|---|---|---|
| 195 30 587 | 2/1997 | Germany . |
| 195 39 070 | 4/1997 | Germany . |
| 2-158445 | 6/1990 | Japan . |
| 4-321454 | 11/1992 | Japan . |
| WO 92/05980 | 4/1992 | WIPO . |

*Primary Examiner*—J. J. Swann
*Assistant Examiner*—Christopher D Bottorff
*Attorney, Agent, or Firm*—Kenyon & Kenyon

[57] ABSTRACT

An apparatus for noncontact transmission of signals between a steering wheel and a steering column includes an airbag triggering device and a diagnostic device on the steering wheel side. The diagnostic device monitors the function of the airbag triggering device and transmits its diagnostic signal via a rotary transfer unit to a control device located on the steering column side. A simulation circuit, which can be set as a function of the diagnostic signal to the diagnosed resistance of the triggering device, precedes the control device on the steering column side.

5 Claims, 1 Drawing Sheet

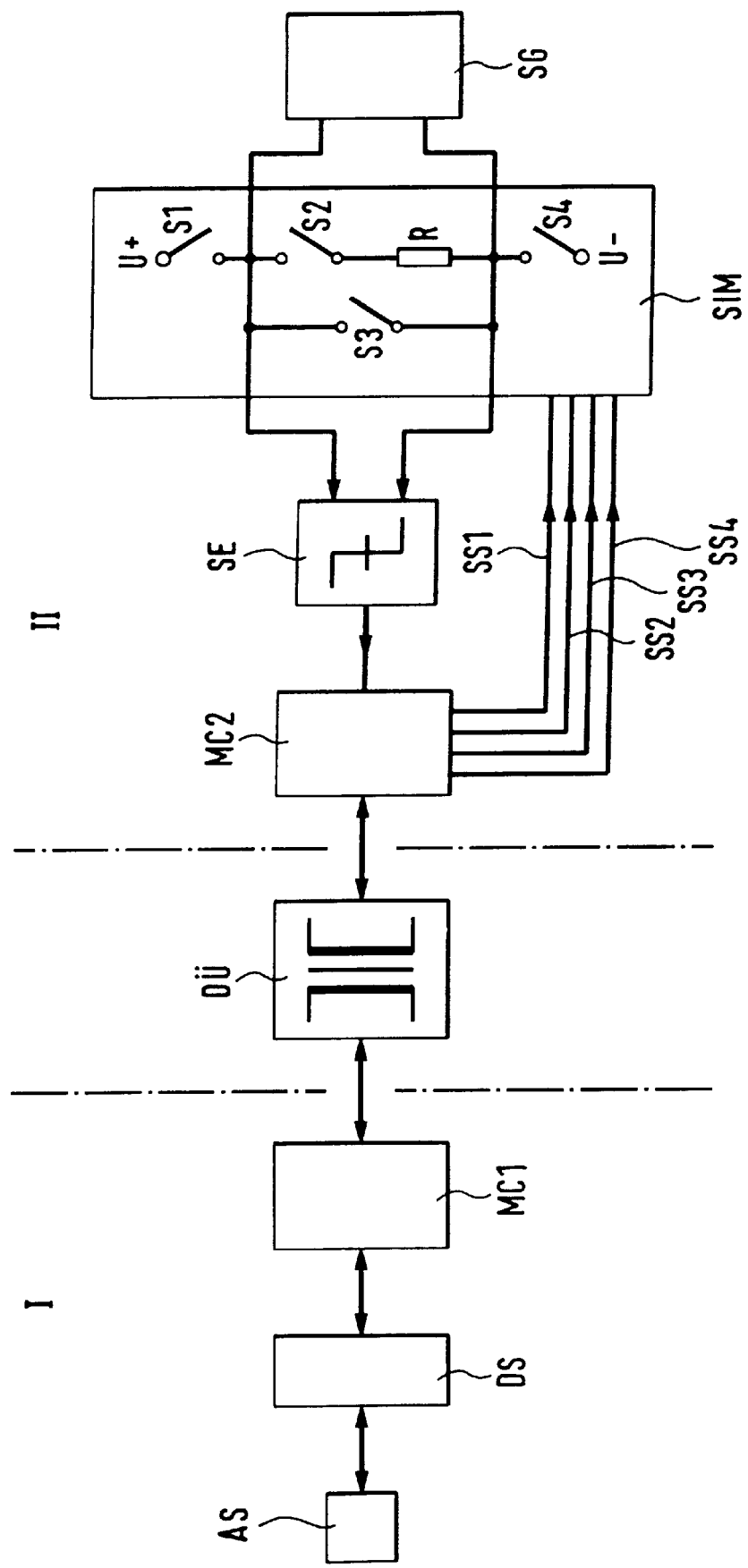

APPARATUS FOR NONCONTACT TRANSMISSION OF SIGNALS BETWEEN STEERING WHEEL AND STEERING COLUMN

FIELD OF THE INVENTION

The present invention relates to an apparatus for noncontact transmission of signals between a steering wheel and a steering column, the steering wheel side including airbag triggering means and a diagnostic device which transmits a diagnostic signal to a control device located on the steering column side. In the event of a vehicle crash, the control device emits a triggering signal for the triggering means.

BACKGROUND INFORMATION

An apparatus for noncontact transmission between a steering wheel and a steering column is described in German Patent No. 195 39 070 A1. A rotary transfer unit at the connection point between the steering wheel and the steering column provides for noncontact transmission to the control device on the steering column side of the resistance of the triggering means (airbag firing pellet) diagnosed on the steering wheel side. The rotary transfer unit also provides for transmission to the steering-wheel-side triggering means of a triggering signal emitted by the control device. A diagnostic device is provided which measures the resistance of the triggering means and, if a predefined resistance value is exceeded, sends out a fault signal to the control device, which signals the malfunction to the driver of the vehicle. The control device receives no information regarding the type of fault.

SUMMARY OF THE INVENTION

An object of the present invention is to provide an apparatus with which a control device on the steering column side can be informed of a variety of fault states of the airbag triggering means diagnosed on the steering wheel side.

According to the present invention, a simulation circuit precedes the control device on the steering column side. With this simulation circuit, the diagnosed resistance of the triggering means can be set. The resistance of the triggering means diagnosed on the steering wheel side is thus reproduced on the steering column side, so that from this reproduced resistance, the control device can deduce directly whether or not the triggering means is in a fault-free state. With the states of the resistance of the triggering means reproduced by the simulation circuit, the control device can then perform an accurate fault analysis and adapt the diagnosis of the triggering means accordingly. For example, if the control device learns via the simulation circuit that a short circuit to the ground of the supply voltage is present in the triggering means, the control device then instructs that no switching to the positive pole of the supply voltage is to occur during a further diagnosis, since this would result in a firing of the airbag.

A first microcontroller on the steering wheel side then transmits the diagnosed resistance of the triggering means as a report to a second microcontroller on the steering column side. From the report, the second microcontroller derives control signals for setting the resistance of the simulation circuit.

The simulation circuit advantageously includes a resistor which corresponds to the resistance of the triggering means in the fault-free condition, and switches arranged in parallel and in series with the resistor. Using combinations of switch positions, either the fault-free resistance, or a high-level or low-level resistance, or a short circuit to the positive pole, or a short circuit to the negative pole of a supply voltage source, can be implemented. The simulation circuit can thus reproduce all the fault-free and faulty states of the triggering means.

Not only are the diagnostic signals transmitted from the steering wheel side to the steering column side, but also triggering signals emitted by the control device are transmitted in the opposite direction to the triggering means on the steering wheel side.

One advantageous means for signal transmission between the steering wheel side and the steering column side is a rotary transfer unit.

BRIEF DESCRIPTION OF THE DRAWING

The FIGURE shows a circuit diagram of an apparatus in accordance with the present invention.

DETAILED DESCRIPTION

The FIGURE depicts a basic circuit diagram of an apparatus for noncontact transmission of signals between circuits on steering wheel side I and circuits on steering column side II of a motor vehicle. A rotary transfer unit DÜ, for example, provides for noncontact transmission in both directions between steering wheel side I and steering column side II.

A triggering means AS for an airbag is located on steering wheel side I. The functionality of an airbag is continually checked so that it is ready to operate in every emergency situation. In other words, it should be apparent whether the triggering means (firing pellet) of the airbag is in a fault-free state. If the triggering means are faulty, this must be signaled immediately to the driver in the vehicle. It is possible to determine whether or not the triggering means is faulted by measuring their resistance. In the absence of faults, the triggering means has a certain resistance which is typically in the range from 1.8 to 2.5 ohms. If the triggering means is defective, the resistance deviates on either the high or the low side from the predefined value. Malfunctions can also consist in the fact that the triggering means exhibits a short circuit to the positive pole or the negative pole of a supply voltage source. A diagnostic device DS connected to triggering means AS measures the resistance of triggering means AS and forwards the diagnosed resistance value to a first microcontroller MC1 on steering wheel side I. Diagnostic device DS analyzes the measured resistance in order to ascertain whether the triggering means is in a fault-free state or exhibits one of the aforesaid fault states. The diagnostic result is forwarded by first microcontroller MC1 as a report, via rotary transfer unit DÜ, to a second microcontroller MC2 on steering column side II.

A control device SG, which in the event of a vehicle crash emits a triggering signal for triggering means AS of the airbag, is located on steering column side II. Preceding this control device SG is a simulation circuit SIM which serves to reproduce the instantaneous resistance of triggering means AS. Simulation circuit SIM is constructed so that it can reproduce both the correct resistance when the triggering means is n the fault-free state, and the resistance values which occur in the individual fault situations. The simulation circuit includes a resistor R which corresponds to the resistance of the triggering means in the fault-free state. Resistor R is connected in parallel with the inputs of control device SG. Arranged in series and in parallel with resistor are multiple electrically controllable switches (e.g. transistors) S1, S2, S3, S4. A switch S2 is in series with resistor R, and parallel thereto is a switch S3. Also provided is a switch S1 which can connect resistor R to positive pole U+ of a supply voltage, and a switch S4 is present which can short-circuit the resistor to negative pole U− of the supply voltage.

The individual switches S1, S2, S3, and S4 are activated by control signals SS1, SS2, SS3, and SS4, which are made available by the second microcontroller. The states of the individual control signals SS1, SS2, SS3, and SS4 are based on the transmitted diagnostic report, which is transmitted in the form of an interference-resistant bit sequence from the steering wheel side to the steering column side. The possible states of the triggering means, either in the absence of faults or in fault cases, have already been set forth above. For each of these states, control signals SS1, SS2, SS3, SS4 implement the following positions of switches S1, S2, S3, and S4:

1. If the triggering means are in a fault-free state, switch S2 is closed and all the other switches are open.
2. If there is a short circuit of the triggering means to positive pole U+ of the supply voltage, switches S1 and S2 is closed and switches S3 and S4 are open.
3. If there is a short circuit of the triggering means to negative pole U− of the supply voltage, switches S2 and S4 are closed and switches S1 and S3 are open.
4. If the triggering means are at high resistance with respect to the uncontrolled resistor, all the switches S1, S2, S3, and S4 are open.
5. If the triggering means are at low resistance with respect to the fault-free resistor, switches S2 and S3 are closed and all other switches S1, S4 are open.

In the event of a vehicle crash which requires triggering of the airbag, control device SG emits a triggering signal which passes via simulation circuit SIM to a threshold value decider SE. If the output signal of control device SG exceeds a threshold predefined in threshold value decider SE, it is detected as a triggering signal and conveyed to second microcontroller MC2. The latter transmits the triggering signal via rotary transfer unit DÜ to first microcontroller MC1 on steering wheel side I. First microcontroller MC1 then forwards the triggering signal to triggering means AS which thereupon fires the airbag.

What is claimed is:

1. An apparatus for noncontact transmission of signals between a steering wheel and a steering column, comprising:
    an airbag triggering means positioned at a steering wheel side of the transmission;
    a diagnostic device positioned at the steering wheel side of the transmission and monitoring the airbag triggering means;
    a control device positioned at a steering column side of the transmission, the control device emitting a triggering signal to the airbag triggering means in the event of a vehicle crash, the diagnostic device transmitting a diagnostic signal to the control device; and
    a simulation circuit positioned at the steering column side of the transmission and coupled to an input of the control device, the simulation circuit being set as a function of the diagnostic signal to a diagnosed resistance value of the airbag triggering means for reproducing said diagnosed resistance value which occurs in fault and fault-free situations.

2. The apparatus according to claim 1, further comprising:
    a first microcontroller on the steering wheel side of the transmission; and
    a second microcontroller on the steering column side of the transmission, the first microcontroller transmitting the diagnosed resistance of the triggering means as a report to the second microcontroller, the second microcontroller determining control signals for setting a resistance of the simulation circuit as a function of the report.

3. The apparatus according to claim 1, wherein the simulation circuit includes a resistor corresponding to a resistance of the airbag triggering means in a fault-free condition, and switches arranged at least one of in parallel to and in series with the resistor wherein corresponding combinations of switch positions of the switches implement one of the fault-free resistance, a high-level resistance, a low-level resistance, a short circuit to a positive pole of a voltage supply, and a short circuit to a negative pole of the voltage supply.

4. The apparatus according to claim 1, wherein the control device transmits the triggering signal from the steering column side of the transmission to the airbag triggering means on the steering wheel side of the transmission.

5. The apparatus according to claim 1, further comprising:
    a rotary transfer unit providing signal transmission between the steering wheel side of the transmission and steering column side of the transmission.

* * * * *